(12) United States Patent
Millard et al.

(10) Patent No.: US 7,512,392 B2
(45) Date of Patent: Mar. 31, 2009

(54) SYSTEM FOR ADAPTIVELY FILTERING A RECEIVED SIGNAL IN A WIRELESS RECEIVER

(75) Inventors: Jason D. Millard, Irvine, CA (US); William J. Domino, Yorba Linda, CA (US); James R. Snider, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 299 days.

(21) Appl. No.: 10/917,552

(22) Filed: Aug. 12, 2004

(65) Prior Publication Data

US 2006/0035620 A1 Feb. 16, 2006

(51) Int. Cl.
*H04B 7/00* (2006.01)
*H04B 1/16* (2006.01)

(52) U.S. Cl. .................. 455/266; 455/334; 455/339

(58) Field of Classification Search ............... 455/266, 455/130, 334, 338, 339, 63.1, 114.2, 278.1, 455/296, 217, 226.1, 226.2, 226.3
See application file for complete search history.

(56) References Cited

U.S. PATENT DOCUMENTS

| | | | | |
|---|---|---|---|---|
| 5,140,699 A | * | 8/1992 | Kozak | 455/84 |
| 5,148,491 A | * | 9/1992 | Sakamoto et al. | 381/119 |
| 5,361,404 A | * | 11/1994 | Dent | 455/135 |
| 5,758,296 A | * | 5/1998 | Nakamura | 455/575.7 |
| 6,208,202 B1 | * | 3/2001 | Kaufman et al. | 330/51 |
| 6,233,442 B1 | * | 5/2001 | Koda et al. | 455/266 |
| 6,741,837 B1 | * | 5/2004 | Nakano et al. | 455/67.11 |
| 6,806,768 B2 | * | 10/2004 | Klaren et al. | 330/124 R |
| 6,807,222 B1 | * | 10/2004 | Widdowson | 375/147 |
| 6,999,742 B2 | * | 2/2006 | Fang | 455/266 |
| 7,061,993 B2 | * | 6/2006 | Wieck | 375/316 |
| 7,082,294 B2 | * | 7/2006 | Denis et al. | 455/260 |
| 7,151,577 B2 | * | 12/2006 | Yamamoto et al. | 348/729 |
| 7,164,329 B2 | * | 1/2007 | Toncich et al. | 333/139 |
| 2001/0049271 A1 | * | 12/2001 | Hirtzlin et al. | 455/188.1 |
| 2004/0213366 A1 | * | 10/2004 | Ono | 375/348 |
| 2005/0215204 A1 | * | 9/2005 | Wallace et al. | 455/78 |

FOREIGN PATENT DOCUMENTS

JP 356141679 A * 11/1981

OTHER PUBLICATIONS

Abstract of JP 56141679 A, title: Error Signal Compensation System Nov. 5, 1981 By: Ogawa, Koichi; Arai, Shigeru; Ogawa, Seiya.*

* cited by examiner

*Primary Examiner*—Sonny Trinh

(57) ABSTRACT

An adaptive band-pass filter for a wireless receiver comprises a band-pass filter associated with the receiver, the band-pass filter configured to selectively filter the received signal, and a switch responsive to a control signal, the switch configured to control the band-pass filter based on a level of the received signal.

16 Claims, 5 Drawing Sheets

SYSTEM FOR ADAPTIVELY FILTERING A RECEIVED SIGNAL IN A WIRELESS RECEIVER

BACKGROUND OF THE INVENTION

1. Field of the Invention

This invention relates generally to receiver circuit architecture in a wireless portable communication device. More particularly, the invention relates to a selectively switching a band-pass filter in a wireless receiver.

2. Related Art

With the increasing availability of efficient, low cost electronic modules, mobile communication systems are becoming more and more widespread. For example, there are many variations of communication schemes in which various frequencies, transmission schemes, modulation techniques and communication protocols are used to provide two-way voice and data communications in a handheld, telephone-like communication handset. The different modulation and transmission schemes each have advantages and disadvantages.

As these mobile communication systems have been developed and deployed, many different standards, to which these systems must conform, have evolved. For example, in the United States, third generation portable communications systems comply with the IS-136 standard, which requires the use of a particular modulation scheme and access format. In the case of IS-136, the modulation scheme can be 8-quadrature phase shift keying (8QPSK), offset π/4 differential quadrature phase shift keying (π/4-DQPSK) or variations thereof and the access format is TDMA.

In Europe, the global system for mobile communications (GSM) standard requires the use of the gaussian minimum shift keying (GMSK) modulation scheme in a narrow band TDMA access environment, which uses a constant envelope modulation methodology.

Furthermore, in a typical GSM mobile communication system using narrow band TDMA technology, a GMSK modulation scheme supplies a very low noise phase modulated (PM) transmit signal to a non-linear power amplifier directly from an oscillator. In such an arrangement, a non-linear power amplifier, which is highly efficient, can be used thus allowing efficient modulation of the phase-modulated signal and minimizing power consumption. Because the modulated signal is supplied directly from an oscillator, the need for filtering, either before or after the power amplifier, is minimized. Further, the output in a GSM transceiver is a constant envelope (i.e., a non time-varying signal containing only a phase modulated (PM) signal) modulation signal.

One of the advances in portable communication technology is the move toward the implementation of a low intermediate frequency (IF) receiver and a direct conversion receiver (DCR). A low IF receiver converts a radio frequency (RF) signal to an intermediate frequency that is lower than the IF of a convention receiver. A direct conversion receiver downconverts a radio frequency (RF) received signal directly to baseband (DC) without first converting the RF signal to an intermediate frequency (IF). One of the benefits of a direct conversion receiver is the elimination of costly filter components used in systems that employ an intermediate frequency conversion. For example, in a conventional code division multiple access (CDMA) communication system, one or more surface acoustic wave (SAW) filters are implemented to aid in converting the RF signal to an IF signal. To further complicate the circuitry, these SAW filters are typically located on a different device (i.e., "off-chip") than many of the receiver components.

A low IF or a direct conversion receiver allows the filter components to be implemented using electronic circuitry that can be located on the same device (i.e., "on-chip") as many of the receiver components. In a direct conversion receiver implementation, high-order (e.g., fifth-order or higher) active filters are used to convert the received signal from RF to DC. Unfortunately, because the filters are implemented using electronic circuitry on the same chip as the receiver components, the filter adds significant noise to the received signal. The added noise reduces the sensitivity of the receiver, thereby making such an active filter challenging to implement. Furthermore, because a band-pass filter is the first element in the receive chain of a wireless receiver, its loss adds directly to the noise figure of the receiver.

A band-pass filter is desirable for attenuating unwanted "out-of-band" signals that may interfere with the reception of the desired signal. However, the probability of a blocking signal appearing at the desired frequency is rather low. Oftentimes, the band-pass filter is not needed in the receive chain either because there is no blocking signal, or because the receive signal is of sufficient strength to negate the usefulness of the band-pass filter. Unfortunately, the band-pass filter is always present, thus contributing to a degradation of receiver sensitivity, regardless of whether the band-pass filter is needed.

Therefore, it would be desirable to minimize the amount of noise contributed to a received signal by a band-pass filter, while maximizing receiver sensitivity.

SUMMARY

Embodiments of the invention include a system for adaptively filtering a received signal in a wireless receiver. In one embodiment, the system for adaptively filtering a received signal in a wireless receiver comprises an adaptive band-pass filter for a wireless receiver. The adaptive band-pass filter comprises a band-pass filter associated with the receiver, the band-pass filter configured to selectively filter the received signal, and a switch responsive to a control signal, the switch configured to control the band-pass filter based on a level of the received signal.

Related methods of operation and computer readable media are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

Although described with particular reference to a portable transceiver, the system for adaptively filtering a received signal can be implemented in any communication device employing a band-pass filter in a receiver.

The system for adaptively filtering a received signal can be implemented in hardware, software, or a combination of hardware and software. The hardware can be implemented using specialized hardware elements and logic. The software portion can be stored in the memory and be executed by a suitable instruction execution system (i.e., a microprocessor).

The hardware implementation of the system for adaptively filtering a received signal can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the system for adaptively filtering a received signal comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1:
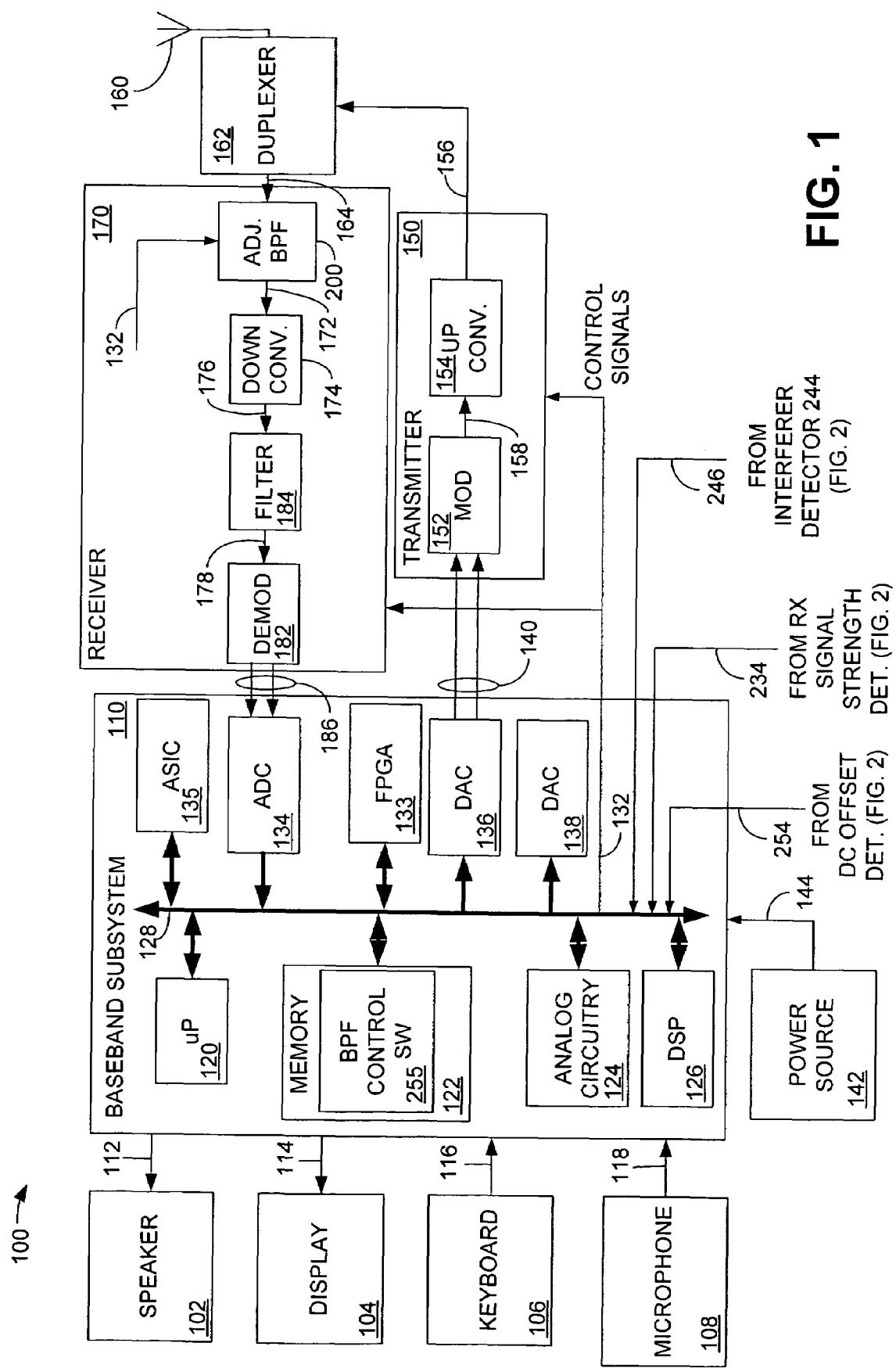
FIG. 1 is a block diagram illustrating a simplified portable transceiver including a filter chain in accordance with the invention.

FIG. 1 is a block diagram illustrating a simplified portable transceiver 100 including a receiver having an adaptive band-pass filter 200. Portable transceiver 100 includes speaker 102, display 104, keyboard 106, and microphone 108, all connected to baseband subsystem 110. A power source 142, which may be a direct current (DC) battery or other power source, is also connected to the baseband subsystem 110 via connection 144 to provide power to the portable transceiver 100. In one embodiment, the portable transceiver 100 can be, for example but not limited to, a portable telecommunication device such as a mobile cellular-type device. Speaker 102 and display 104 receive signals from baseband subsystem 110 via connections 112 and 114, respectively, as known to those skilled in the art. Similarly, the keyboard 106 and the microphone 108 supply signals to baseband subsystem 110 via connections 116 and 118, respectively. Baseband subsystem 110 includes microprocessor (µP) 120, memory 122, analog circuitry 124, and digital signal processor (DSP) 126 in communication via bus 128. Bus 128, although shown as a single bus, may be implemented using multiple busses connected as necessary among the subsystems within baseband subsystem 110.

In one embodiment, depending on the manner in which the adaptive band-pass filter to be described below is implemented, the baseband subsystem 110 may also include an application specific integrated circuit (ASIC) 135 and a field programmable gate array (FPGA) 133.

Microprocessor 120 and memory 122 provide the signal timing, processing and storage functions for portable transceiver 100. Analog circuitry 124 provides the analog processing functions for the signals within baseband subsystem 110. Baseband subsystem 110 provides control signals to transmitter 150 and receiver 170 via connection 132. Although shown as a single connection 132, the control signals may originate from the DSP 126, the ASIC 135, the FPGA 133, or from microprocessor 120, or from another component, and are supplied to a variety of connections within the transmitter 150 and the receiver 170. It should be noted that, for simplicity, only the basic components of portable transceiver 100 are illustrated herein. The control signals provided by the baseband subsystem 110 control the various components within the transmitter 150 and the receiver 170.

Because at least one embodiment of the adaptive band-pass filter is implemented wholly or partially in software that is executed by the microprocessor 120, the memory 122 also includes the band-pass filter control software 255. The band-pass filter control software 255 comprises one or more executable code segments that can be stored in the memory and executed in the microprocessor 120 or the DSP 126. Alternatively, the functionality of the band-pass filter control software 255 can be coded into the ASIC 135 or can be executed by the FPGA 133. Because the memory 122 can be rewritable and because the FPGA 133 is reprogrammable, updates to the band-pass filter control software 255 can be remotely sent to and saved in the portable transceiver 100 when implemented using any of these methodologies.

Baseband subsystem 110 also includes analog-to-digital converter (ADC) 134 and digital-to-analog converters (DACs) 136 and 138. Although DACs 136 and 138 are illustrated as two separate devices, it is understood that a single digital-to-analog converter may be used that performs the function of DACs 136 and 138. ADC 134, DAC 136 and DAC 138 may also communicate with microprocessor 120, memory 122, analog circuitry 124 and DSP 126 via bus 128. DAC 136 converts the digital communication information within baseband subsystem 110 into an analog signal for transmission to a modulator 152 via connection 140. Connection 140, while shown as two directed arrows, includes the information that is to be transmitted by the transmitter 150 after conversion from the digital domain to the analog domain.

The transmitter 150 includes modulator 152, which modulates the analog information in connection 140 and provides a modulated signal via connection 158 to upconverter 154. The upconverter 154 transforms and amplifies the modulated signal on connection 158 to an appropriate transmit frequency and power level for the system in which the portable transceiver 100 is designed to operate. Details of the modulator 152 and the upconverter 154 have been omitted for simplicity, as they will be understood by those skilled in the art. For example, the data on connection 140 is generally formatted by the baseband subsystem 110 into in-phase (I) and quadrature (Q) components. The I and Q components may take different forms and be formatted differently depending upon the communication standard being employed.

The upconverter 154 supplies the upconverted signal via connection 156 to duplexer 162. The duplexer comprises a filter pair that allows simultaneous passage of both transmit signals and receive signals, as known to those having ordinary skill in the art. The transmit signal is supplied from the duplexer 164 to the antenna 160.

A signal received by antenna 160 will be directed from the duplexer 162 via connection 164 to the receiver 170. The receiver 170 includes an adaptive band-pass filter 200 constructed in accordance with an embodiment of the invention, a downconverter 174, a low-noise filter 184, and a demodulator 182. The adaptive band-pass filter 200 is controlled by a control signal over connection 132 to selectively filter the received signal based on various parameters, such as, for example, receive signal strength, whether an interfering signal sufficient to degrade the sensitivity of the receiver is present, or other parameters. Because the band-pass filter (to be described below) in the adjustable band-pass filter 200 is lossy and not always needed to filter the received signal on connection 164, the adjustable band-pass filter is controlled according to an embodiment of the invention to be selectively bypassed, depending on various signal parameters. The signal used to control the adjustable band-pass filter 200 can be received from the baseband subsystem 110 via connection 132, based on measured values from the receiver, on values calculated based on the level of the receive signal or on other measured or calculated values. The adaptive band-pass filter 200 and the control thereof will be described below.

The downconverter 172 includes at least one low-noise amplifier (LNA) (not shown) and circuitry (not shown) to convert the received signal from an RF level to a baseband level (DC). The DC level signal is sent to the low-noise filter 184 via connection 174. The low-noise filter 184 comprises a least one filter stage comprising an amplifier (not shown) and a filter (not shown). The filtered signal from the filter 184 is provided to the demodulator 182 via connection 178.

The demodulator 182 recovers the transmitted analog information and supplies a signal representing this information via connection 186 to ADC 134. ADC 134 converts these analog signals to a digital signal at baseband frequency and transfers the signal via bus 128 to DSP 126 for further processing.

Figure 2:
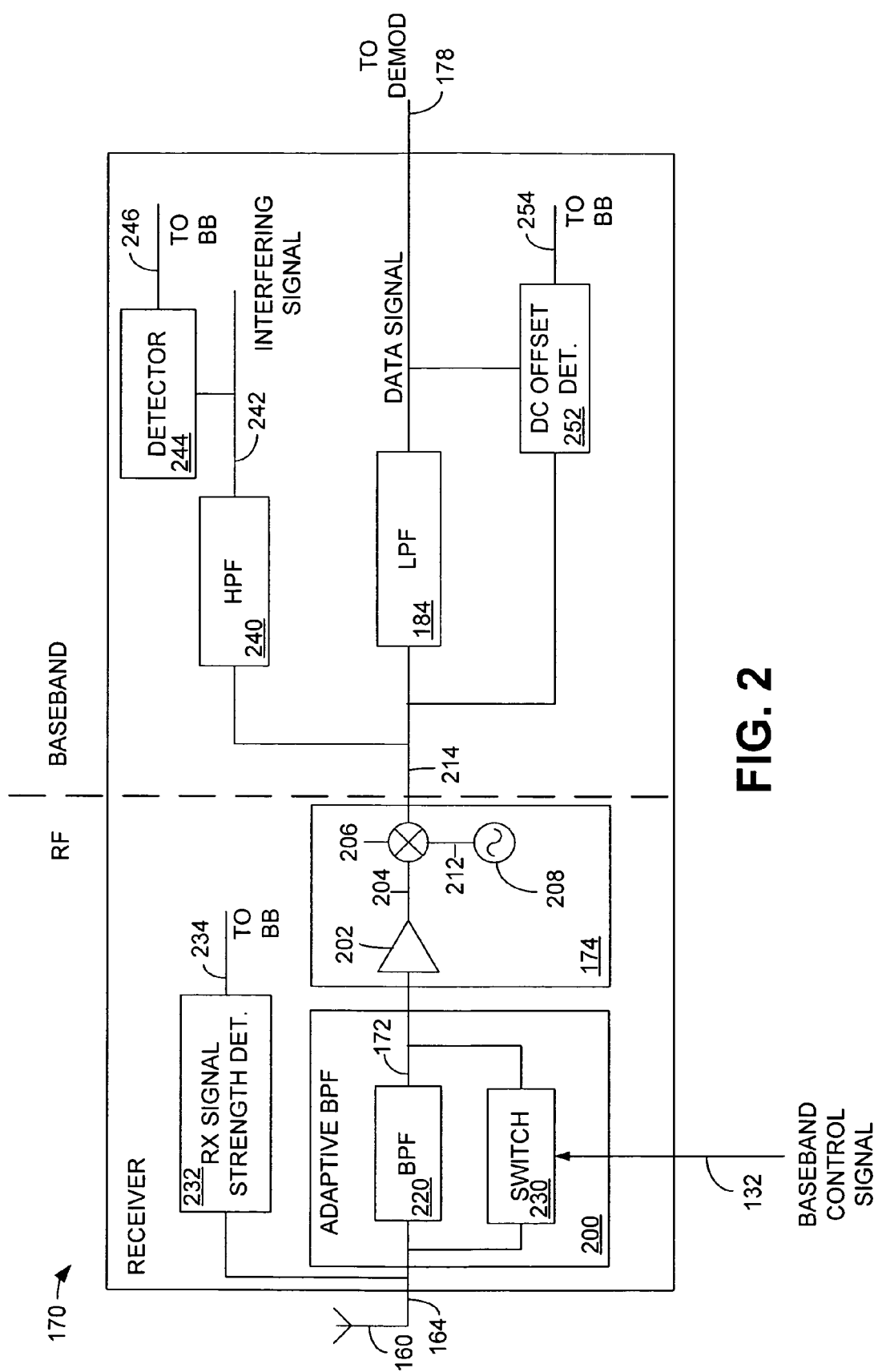
FIG. 2 is a block diagram illustrating the receiver of FIG. 1.

FIG. 2 is a block diagram illustrating, in greater detail, one embodiment of the receiver 170 of FIG. 1. The receiver 170 receives a signal via antenna 160, which supplies the received signal at an RF frequency level via the duplexer (not shown) to the adaptive band-pass filter 200. The adaptive band-pass filter 200 comprises a band-pass filter 220, which may be implemented as a surface acoustic wave (SAW) filter, and a switch 230. The switch 230 is controlled to bypass the band-pass filter 220, when it is determined that the band-pass filter is not needed to filter the received signal. The band-pass filter is typically used to attenuate out-of-band-interfering signals that may degrade the sensitivity of the receiver 170. The band-pass filter is typically a lossy element. However, depending on the receive parameters, there may be circumstances in which the band-pass filter is not needed to filter the received signal. In those circumstances in which the band-pass filter 220 is deemed not needed, the switch 230 is controlled to allow the received signal to bypass the band-pass filter 220. In one embodiment, the switch 230 exhibits high-isolation when open and low-loss when closed. For example, the switch may be implemented using field effect transistor (FET) circuitry.

The switch 230 is controlled by, for example, a control signal supplied via connection 132 from the baseband subsystem 110. The signal that controls the switch 230 can be generated using various parameters as input. In one embodiment, the strength of the receive signal on connection 164 is measured by a receive signal strength detector 232, which may be implemented in various ways as known in the art. The output of the receive signal strength detector 232 is sent via connection 234 to the baseband subsystem 110. For example, the signal indicative of the strength of the received signal can be processed by the DSP 126 (FIG. 1) or the microprocessor 120 (FIG. 1) to generate what is referred to as an "RXLEV" signal. The RXLEV signal is indicative of the strength of the receive signal. The baseband subsystem then generates a control signal based on the RXLEV signal, and delivers the control signal via connection 132 to control the operation of the switch 230. Control signals based on other parameters will be described below. For example, the RXLEV signal in a GSM communication system may correspond to the receive signal strength as shown in Table 1 below.

TABLE 1

| | |
|---|---|
| RXLEV 0 = less than | −110 dBm + SCALE. |
| RXLEV 1 = −110 dBm + SCALE to | −109 dBm + SCALE. |
| RXLEV 2 = −109 dBm + SCALE to | −108 dBm + SCALE. |
| . | |
| . | |
| . | |
| RXLEV 62 = −49 dBm + SCALE to | −48 dBm + SCALE. |
| RXLEV 63 = greater than | −48 dBm + SCALE. |

SCALE is an offset that is used in an "ENHANCED MEASUREMENT REPORT message, otherwise it is 0.

The output of the adaptive band-pass filter 200 is supplied via connection 172 to a low noise amplifier (LNA) 202. The LNA 202 amplifies the received signal and provides the amplified signal on connection 204 to the mixer 206. The mixer 206 receives a frequency reference signal, also called a "local oscillator" signal, or "LO," from a synthesizer 208, via connection 212. The LO signal determines the frequency to which the mixer 206 downconverts the signal received from LNA 202 via connection 204. In the case of a direct conversion receiver, the mixer 206 downconverts the received RF signal to a DC signal on connection 214.

The DC signal on connection 214 is then supplied to the low-pass filter 184 and to a high-pass filter 240. The low-pass filter 184 comprises at least one filter stage (not shown), which generally comprises a variable gain amplifier (not shown) and a filter (not shown). The output of the low-pass filter is the desired signal and is supplied via connection 178 to the demodulator 182 for further processing.

The DC signal on connection 214 is also supplied to a high-pass filter 240 and to a DC offset detector 252. In one embodiment, the high-pass filter 240 filters the signal on connection 214 and, if an interfering signal is present on connection 214, provides the interfering signal on connection 242. An interfering signal may be, for example, a high amplitude signal from a different communication system provider, that may be of sufficient strength to degrade the sensitivity of the receiver 170. The presence of an interfering signal on connection 242 can be detected by the interfering signal detector 244, which provides information relating to the interfering signal on connection 246. The signal on connection 246 is supplied to the baseband subsystem 110 (FIG. 1), where it is processed by, for example, the DSP 126 or the microprocessor 120, to develop a control signal with which to control the switch 230 based on the presence of an interfering signal.

In another embodiment, the DC offset detector 252 can be used to detect the presence of an interfering signal at the receiver 170. The presence of DC offset on connection 214 or connection 178 is indicative of the presence of an interfering signal of sufficient strength to degrade the sensitivity of the receiver 170. The presence of DC offset on connection 214 or 178 can be detected by the DC offset detector 252, which provides information relating to the interfering signal on connection 254. The signal on connection 254 is supplied to the baseband subsystem 110 (FIG. 1), where it is processed by, for example, the DSP 126 or the microprocessor 120, to develop a control signal with which to control the switch 230 based on the presence of an interfering signal.

In another embodiment, the baseband subsystem can generate what is referred to as an RXQUAL" signal, which can be used to generate a control signal used to control the operation of the switch 230. For example, the RXQUAL signal can be calculated by the DSP 126 (FIG. 1) or the microprocessor 120 (FIG. 1) based on a bit error ratio (BER) of the received signal. The RXQUAL signal can then be used as the basis from which to generate a control signal based on the RXQUAL signal, which can be used to control the operation of the switch 230 via connection 132. For example, the RXQUAL signal in a GSM communication system may correspond to the BER as shown in Table 2 below.

TABLE 2

| RXQUAL_0 | BER < 0.2% | Assumed value = 0.14% |
|---|---|---|
| RXQUAL_1 | 0.2% < BER < 0.4% | Assumed value = 0.28% |
| RXQUAL_2 | 0.4% < BER < 0.8% | Assumed value = 0.57% |
| RXQUAL_3 | 0.8% < BER < 1.6% | Assumed value = 1.13% |
| RXQUAL_4 | 1.6% < BER < 3.2% | Assumed value = 2.26% |
| RXQUAL_5 | 3.2% < BER < 6.4% | Assumed value = 4.53% |
| RXQUAL_6 | 6.4% < BER < 12.8% | Assumed value = 9.05% |
| RXQUAL_7 | 12.8% < BER < 0.8% | Assumed value = 18.10% |

Figure 3:
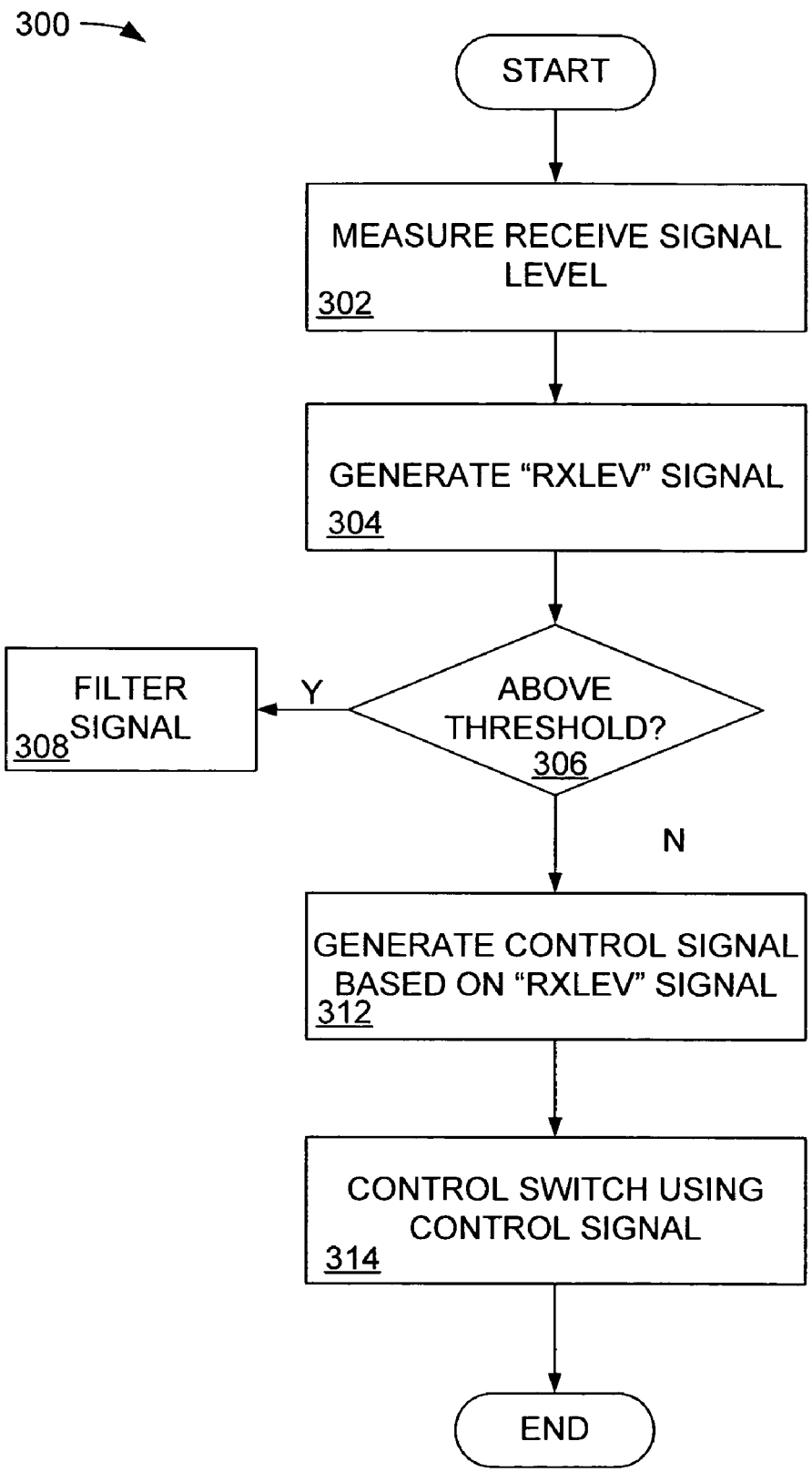
FIG. 3 is a flowchart describing the operation of a first embodiment of the adaptive band-pass filter of FIG. 2.
Figure 4:
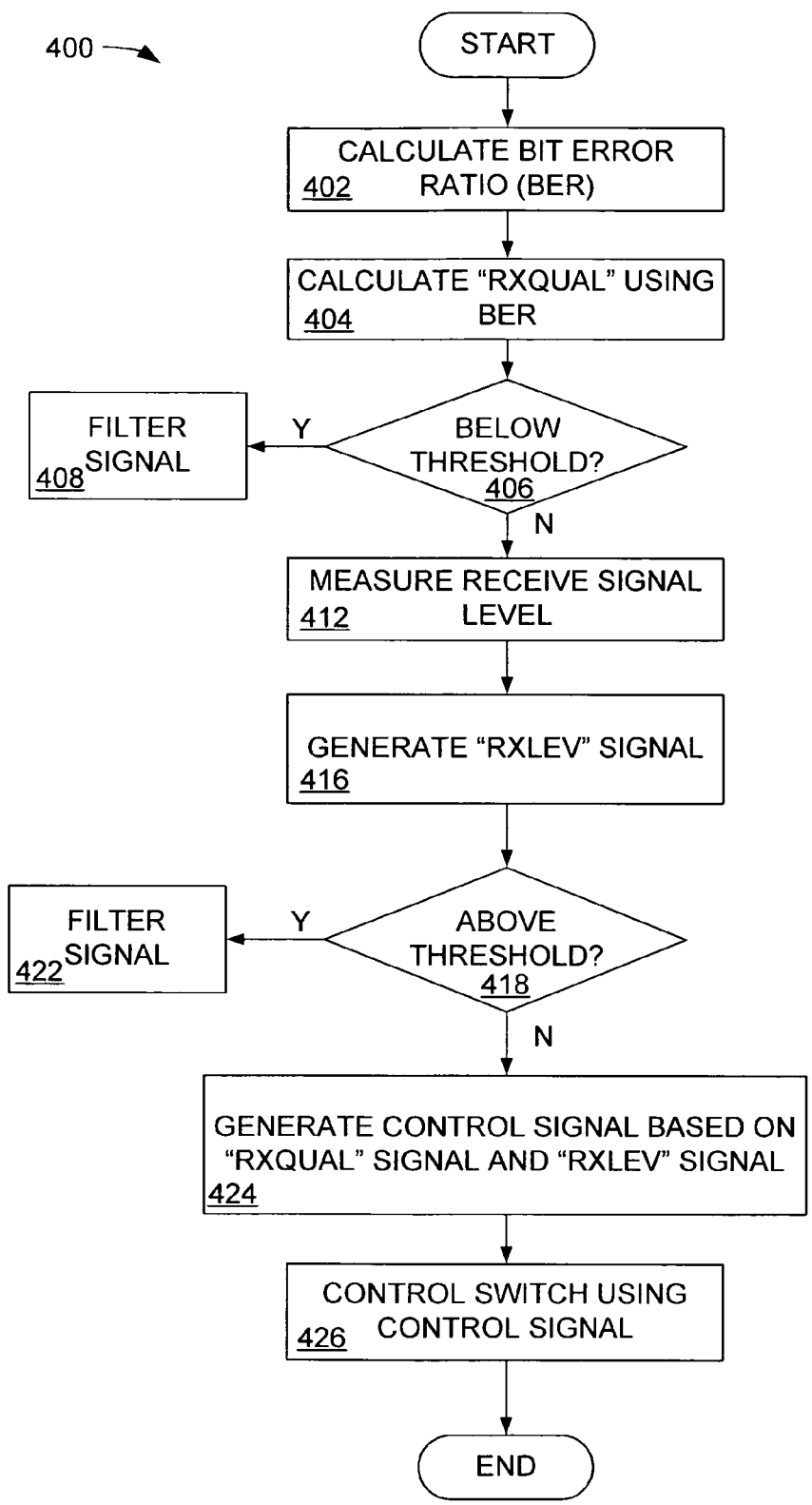
FIG. 4 is a flowchart describing the operation of another embodiment of the adaptive band-pass filter of FIG. 2.
Figure 5:
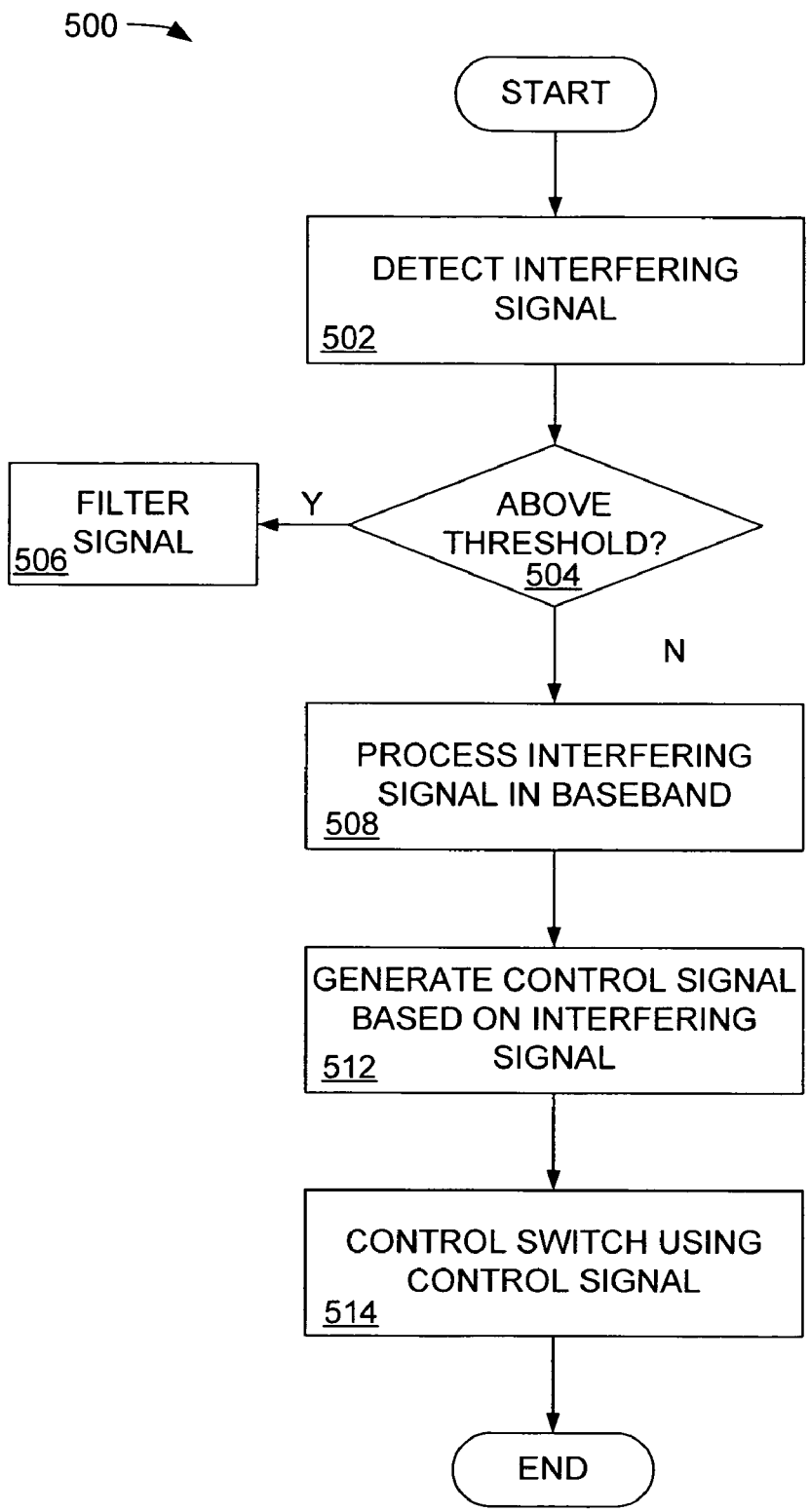
FIG. 5 is a flowchart describing the operation of another embodiment of the adaptive band-pass filter of FIG. 2.

FIGS. 3-5 are flowcharts describing the operation and functionality of various embodiments of the invention. The steps in the flowcharts can be executed in the order shown, out of the order shown, or the steps in the flowcharts can be executed concurrently.

FIG. 3 is a flowchart 300 describing the operation of a first embodiment of the adaptive band-pass filter 200. In block 302 a signal received by the antenna 160 is measured to determine its signal strength. For example, the received signal strength detector 232 (FIG. 2) can be used to determine the strength of the received signal. In block 304, the baseband subsystem 110 (FIG. 1) receives the signal strength signal via connection 224 and generates a "RXLEV" signal. The RXLEV signal can be generated by, for example, the DSP 126, the microprocessor 120, the ASIC 135 or the FPGA 133, of FIG. 1, under the control of the band-pass filter control software 255. The RXLEV signal is communicated from the baseband subsystem 110 via connection 132 to the receiver 170, and specifically to the adjustable band-pass filter 200 (FIG. 2).

In block 306, it is determined whether the RXLEV signal is above a predetermined threshold. The threshold may be, for example, RXLEV 8 according to Table 1. If it is determined in block 306 that the RXLEV signal is above the predetermined threshold, then, in block 308, the received signal continues to be filtered by the adjustable band-pass filter 220. This is accomplished via a control signal sent from the baseband subsystem 110 via the connection 132 to open the switch 230. When the switch 230 is open (i.e., the receive signal is supplied to the band-pass filter 220) it is preferable that the switch 230 exhibit high electrical isolation.

If, however, it is determined in block 306 that the RXLEV signal is below the predetermined threshold, then, in block 312, a control signal is generated in the baseband subsystem 110, based upon the level of the RXLEV signal to bypass the band-pass filter 220. In block 314, the control signal is used to control the switch 230 of FIG. 2 to bypass the band-pass filter 220.

FIG. 4 is a flowchart 400 describing the operation of another embodiment of the adaptive band-pass filter 200. In block 402, the baseband subsystem 110 calculates a bit-error ratio (BER) of the received signal. The BER of the received signal indicates various parameters of the signal, including signal strength, signal quality, quality of the transmission channel, etc. The bit-error ratio can be calculated by, for example, the DSP 126, the microprocessor 120, the ASIC 135, or the FPGA 133 of FIG. 1. The calculation of BER is known to those having ordinary skill in the art.

In block 404, the signal "RXQUAL" is calculated using the value of the bit-error ratio calculated in block 402. As shown in Table 2 above, an RXQUAL signal level corresponds to the bit-error ratio calculated in block 402.

In block 406 it is determined whether the RXQUAL signal is below a predetermined threshold. If, in block 406, it is determined that the RXQUAL signal is below the predetermined threshold, then, in block 408, the received signal is supplied to the band-pass filter 220 of FIG. 2 by opening the switch 230 via a control signal on connection 132. This is accomplished via a control signal sent from the baseband subsystem 110 via the connection 132 to open the switch 230. When the switch 230 is open (i.e., the receive signal is supplied to the band-pass filter 220) it is preferable that the switch 230 exhibit high electrical isolation.

If, however, in block 406 it is determined that the RXQUAL signal is above the predetermined threshold, then, in block 412 a signal received by the antenna 160 is measured to determine its signal strength. For example, the received signal strength detector 232 (FIG. 2) can be used to determine the strength of the received signal. In block 416, the baseband subsystem 110 (FIG. 1) receives the signal strength signal via connection 224 and generates a "RXLEV" signal. The RXLEV signal can be generated as described above. The RXLEV signal is communicated from the baseband subsystem 110 via connection 132 to the receiver 170, and specifically to the adjustable band-pass filter 200 (FIG. 2).

In block 418, it is determined whether the RXLEV signal is above a predetermined threshold. The threshold may be, for example, RXLEV 8 according to Table 1. If it is determined in block 418 that the RXLEV signal is above the predetermined threshold, then, in block 422, the received signal continues to be filtered by the adjustable band-pass filter 220. This is accomplished via a control signal sent from the baseband subsystem 110 via the connection 132 to open the switch 230. When the switch 230 is open (i.e., the receive signal is supplied to the band-pass filter 220) it is preferable that the switch 230 exhibit high electrical isolation.

If, however, it is determined in block 418 that the RXLEV signal is below the predetermined threshold, then, in block 424, the baseband subsystem 110 generates a control signal based on the RXQUAL signal and on the RXLEV signal to bypass the band-pass filter 220. The determination of received signal level and BER prevents the band-pass filter 220 from being bypassed in the situation in which a strong interfering signal causes a high BER, while the received signal is high. In such a case, it is desirable to allow the band-pass filter to continue filtering the received signal. In block 426, the control signal is supplied via connection 132 to the switch 230 of FIG. 2 to bypass the band-pass filter 220. The predetermined threshold can be, for example, an RXQUAL signal above the value 2 and an RXLEV signal below the value 8.

FIG. 5 is a flowchart 500 describing the operation of another embodiment of the adaptive band-pass filter 200. In block 502 an interfering signal is detected. The interfering signal can be detected using, for example, the high-pass filter 240 and the interfering signal detector 244 of FIG. 2, or an interfering signal can be detected using the DC offset detection element 252 of FIG. 2. The interfering signal detector 244 can be, for example, a diode detector or the like. Alternatively, an interfering signal can be detected using a combination of the high-pass filter 240, interfering signal detector 244 and the DC offset detector 252.

If the interring signal is detected using the interfering signal detector 244, then the output of the interfering signal detector 244 is supplied via connection 246 to the baseband subsystem 110. If the interfering signal is detected by measuring the DC offset of the data signal either before or after the low-pass filter 184 using the DC offset detector 252 of FIG. 2, then the output of the DC offset detector 252 is supplied via connection 254 to the baseband subsystem 110.

In block 504, the baseband subsystem 110, and more specifically, the DSP 126, the microprocessor 120, the ASIC 135, or the FPGA 133, under the control of the band-pass filter control software 255, processes the signal on connection 246 or 254 to determine whether the interfering signal is above a predefined threshold. If it is determined in block 504 that the interfering signal is above a predefined threshold, then the received signal is filtered in the band-pass filter 220 in block 506 by generating a control signal via connection 132 to open the switch 230.

If, however, in block 504 it is determined that the interfering signal is below the predefined threshold, then, in block 508, the interfering signal is processed in the baseband subsystem 110. In block 512, the baseband subsystem 110, and more specifically, the DSP 126, the microprocessor 120, the ASIC 135 or the FPGA 133 generates a control signal based on the presence and the level of the interfering signal. In block 514, the control signal is delivered to the adjustable band-pass filter 200 via connection 132 to control the switch 230 to bypass the band-pass filter 220.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method comprising:
   receiving a wirelessly-transmitted signal;
   inserting an adaptive filter between an antenna and a low-noise amplifier in a receiver; and
   controllably applying the adaptive filter in accordance with a control signal generated in a baseband portion of the receiver, the control signal generated in response to a bit-error ratio of the received signal as calculated in the baseband portion of the receiver and an indication of the received signal strength.

2. The method of claim 1, wherein controllably applying comprises causing the wirelessly-transmitted signal to bypass the adaptive filter if a quality level of the wirelessly-transmitted signal is above a signal quality threshold.

3. The method of claim 1, wherein controllably applying comprises detecting an interfering signal; and
   causing the wirelessly-transmitted signal to bypass the adaptive filter if a signal strength level of the interfering signal is below an interfering signal threshold.

4. The method of claim 3, wherein detecting an interfering signal comprises inserting a detector at the output of a high pass filter in the baseband of a portable transceiver.

5. The method of claim 3, wherein detecting an interfering signal comprises inserting a DC offset detector in parallel with a low-pass filter in the baseband of a portable transceiver.

6. A method comprising:
   receiving a wirelessly-transmitted signal;
   inserting an adaptive filter between an antenna and a low-noise amplifier in a receiver;
   calculating a received signal quality level in a baseband portion of the receiver;
   detecting a received signal strength level; and
   controllably applying the adaptive filter in accordance with a control signal generated in the baseband portion of the receiver, the control signal responsive to a comparison of the received signal quality level and a signal quality threshold and a comparison of the received signal strength level and a signal strength threshold.

7. The method of claim 6, wherein the received signal quality level is based on a bit error ratio (BER).

8. The method of claim 6, further comprising causing the wirelessly-transmitted signal to bypass the adaptive filter if the received signal strength level of the wirelessly-transmitted signal is above the signal strength threshold.

9. A method comprising:
   receiving a wirelessly-transmitted signal;
   inserting an adaptive filter between an antenna and a low-noise amplifier in a receiver;
   detecting a received signal strength:
   detecting an interfering signal in a baseband portion of the receiver by identifying a DC offset;
   generating a control signal in the baseband portion of the receiver responsive to a comparison of the received signal strength and a first threshold and a comparison of a bit-error ratio and a second threshold; and
   controllably applying the adaptive filter in accordance with the control signal.

10. The method of claim 9, wherein detecting an interfering signal comprises applying a downconverted representation of the wirelessly-transmitted signal to an interfering signal detector coupled in parallel with a low-pass filter.

11. The method of claim 9, wherein detecting an interfering signal comprises applying a downconverted representation of the wirelessly-transmitted signal to a detector coupled to an output of a high-pass filter.

12. A system comprising:
   an antenna configured to receive a wirelessly-transmitted signal;
   a band-pass filter having an input coupled to the antenna and an output coupled to a low-noise amplifier, the band-pass filter configured to filter the wirelessly-transmitted signal;
   a switch coupled to the input and the output of the band-pass filter, the switch configured to cause the wirelessly-transmitted signal to bypass the band-pass filter in response to a control signal; and
   a baseband detector configured to determine the presence of an interfering signal in the wirelessly-transmitted signal by at least one of detecting a DC offset in parallel with a low-pass filter arranged to receive a DC signal and detecting high-frequency at the output of a high pass filter arranged to receive the DC signal.

13. The system of claim 12, wherein the switch causes the wirelessly-transmitted signal to bypass the band-pass filter if a quality level of the wirelessly-transmitted signal is above a signal quality threshold.

14. The system of claim 13, wherein the quality level of the wirelessly-transmitted signal is based on a bit error ratio (BER) of the wirelessly-transmitted signal.

15. The system of claim 12, wherein the switch causes the wirelessly-transmitted signal to bypass the band-pass filter if a signal strength level of an interfering signal is below an interfering signal strength threshold.

16. The system of claim 12, wherein the system is a portable transceiver.

* * * * *